(12) United States Patent
Pechanek et al.

(10) Patent No.: US 7,971,036 B2
(45) Date of Patent: Jun. 28, 2011

(54) METHODS AND APPARATUS FOR ATTACHING APPLICATION SPECIFIC FUNCTIONS WITHIN AN ARRAY PROCESSOR

(75) Inventors: Gerald George Pechanek, Cary, NC (US); Mihailo M. Stojancic, Berkeley, CA (US)

(73) Assignee: Altera Corp., San Jose, CA (US)

( * ) Notice: Subject to any disclaimer, the term of this patent is extended or adjusted under 35 U.S.C. 154(b) by 403 days.

(21) Appl. No.: 11/736,788

(22) Filed: Apr. 18, 2007

(65) Prior Publication Data

US 2008/0040585 A1    Feb. 14, 2008

Related U.S. Application Data

(60) Provisional application No. 60/795,140, filed on Apr. 26, 2006.

(51) Int. Cl.
| | |
|---|---|
| *G06F 7/38* | (2006.01) |
| *G06F 9/00* | (2006.01) |
| *G06F 9/44* | (2006.01) |
| *G06F 15/00* | (2006.01) |

(52) U.S. Cl. ............................. 712/220; 712/4; 712/228

(58) Field of Classification Search .................. 712/220, 712/4, 228
See application file for complete search history.

(56) References Cited

U.S. PATENT DOCUMENTS

| | | | | |
|---|---|---|---|---|
| 4,912,636 | A | * | 3/1990 | Magar et al. .................. 710/111 |
| 6,202,130 | B1 | * | 3/2001 | Scales, III et al. ............ 711/137 |
| 6,622,234 | B1 | | 9/2003 | Pechanek et al. |
| 7,257,696 | B2 | | 8/2007 | Pechanek et al. |
| 7,340,591 | B1 | * | 3/2008 | Pechanek et al. ............. 712/217 |
| 2008/0133892 | A1 | | 6/2008 | Pechanek et al. |

OTHER PUBLICATIONS

Hennessy et al., Computer Architecture A Quantitative Approach, Chapter 8.1, 1995.*

* cited by examiner

*Primary Examiner* — Alford W Kindred
*Assistant Examiner* — Jesse R Moll
(74) *Attorney, Agent, or Firm* — Priest & Goldstein, PLLC

(57) ABSTRACT

A multi-node video signal processor ($VSP_N$) is describes that tightly couples multiple multi-cycle state machines (hardware assist units) to each processor and each memory in each node of an N node scalable array processor. $VSP_N$ memory hardware assist instructions are used to initiate multi-cycle state machine functions, to pass parameters to the multi-cycle state machines, to fetch operands from a node's memory, and to control the transfer of results from the multi-cycle state machines.

20 Claims, 5 Drawing Sheets

Load Hardware Assist (LHA): Encoding

| 31 30 29 28 | 27 26 25 | 24 | 23 22 | 21 | 20 19 18 17 16 | 15 14 13 | 12 11 10 9 | 8 | 7 | 6 | 5 4 | 3 2 | 1 0 |
|---|---|---|---|---|---|---|---|---|---|---|---|---|---|
| Group | S/P L/S | 111 | CE1 | Size | 0 CRF-Rx / 0 CRF-Rxe 0 Source Reg | An | HA Target Register pair Rae (Address) | Dec/ Inc | Imm/ Reg | Updt An | Rz/ Az | 0 EN F0 | Az |

Syntax/Operation

| Instruction | Operands | Operation |
|---|---|---|
| Load Compute Register ||| 
| LHA.[SP].D | Rte, An, ±RzAz | HARae ← An<br>An ← An ± (RzAz * 8)$_{dword}$ (post update)<br>HARao ← CRFRxe if Rz/Az=0<br>HARao ← CRFRx if Rz/Az=1 |
| LHA.[SP].W | Rt, An, ±RzAz | HARae ← An<br>An ← An ± (RzAz * 4)$_{word}$ (post update)<br>HARao ← CRFRxe if Rz/Az=0<br>HARao ← CRFRx if Rz/Az=1 |
| LHA.[SP].H0 | Rt, An, ±RzAz | HARae ← An<br>An ← An ± (RzAz * 2)$_{hword}$ (post update)<br>HARao ← CRFRxe if Rz/Az=0<br>HARao ← CRFRx if Rz/Az=1 |
| LHA.[SP].B0 | Rt, An, ±RzAz | HARae ← An<br>An ← An ± RzAz$_{byte}$ (post update)<br>HARao ← CRFRxe if Rz/Az=0<br>HARao ← CRFRx if Rz/Az=1 |
| T.LHA.[SP].[DWH0B0] | Rt, An, ±RzAz | Do operation only if T condition is satisfied in F0 |

F0 ← logical OR of F1-F7
F1 ← HA-1 operation is complete
F2 ← HA-2 operation is complete
:
F7 ← HA-7 operation is complete

Fig. 3B

METHODS AND APPARATUS FOR ATTACHING APPLICATION SPECIFIC FUNCTIONS WITHIN AN ARRAY PROCESSOR

RELATED U.S. APPLICATION DATA

The present application claims the benefit of U.S. Provisional Application No. 60/795,140, filed Apr. 26, 2006, which is incorporated by reference herein in its entirety.

FIELD OF THE INVENTION

The present invention relates generally to improvements in parallel data processing architectures for video processing and more particularly to apparatus and methods for attaching application specific functions within an array processor.

BACKGROUND OF THE INVENTION

Increasing demand for high definition TV products, including interactive TV in a HD format and HD video compression encoding and decoding, requires increasing sophistication, flexibility, and performance in the supporting electronics. The sophistication, flexibility, and performance requirements for HD TV exceeds the capabilities of current generations of processor architectures by, in many cases, orders of magnitude.

The demands of video encoding for HD formats are both memory and data processing intensive, requiring efficient and high bandwidth memory organizations coupled with compute intensive capabilities. In addition, a video encoding product must be capable of supporting multiple standards each of which includes multiple optional features which, can he supported to improve image quality and further reductions in compression bandwidth. Due to these multiple demands, a flexible parallel processing approach must be found to meet the demands in a cost effective manner.

A number of algorithmic capabilities are generally common between multiple video encoding standards, such as MPEG-2, H.264, and SMPTE-VC-1. Motion estimation/compensation and deblocking filtering are two examples of general algorithms that are required for video encoding. To efficiently support motion estimation algorithms and other complex programmable functions which may vary in requirements across the multiple standards, a processor by itself would require signification parallelism and very high clock rates to meet the requirements. A processor of this capability would be difficult to develop in a cost effective manner for commercial products.

An array processor typically requires short pipelines to minimize the complexity of having a large number of processor elements on a single chip. The short pipelines will typically have a minimum number of execution stages, such as a single execution stage or two to four execution stages, since each pipeline stage adds complexity to the processor element and the array processor. As a consequence, simple execution functions are typically defined in the array processor instruction set architecture.

In addition to pipeline control, there are other complexities in an array processor. For example, to meet performance requirements the array processor may need to have a large number of processor elements on a single chip. A large number of processor elements typically limits the operational clock rate due to chip size and wire length constraints. Even when more complex instruction execution functions are defined, such as adding a two-cycle execution function instead of a single cycle execution function, the complex instructions are defined within the constraint of the processor architecture. The more complex functions will typically utilize architectural features in the same manner as the simple execution functions. For example, the fetching of source operands for the more complex function will be accomplished in the same manner as the simpler functions. In a reduced instruction set computer (RISC) processor, the source operands are provided from a central register file and this access method will be used by the more complex function to maintain the programming model for the new instructions added. For memory intensive functions and functions of greater complexity, these standard approaches are inadequate.

SUMMARY OF THE INVENTION

In one or more of its several aspects, the present invention addresses problems such as those described, above. In one of its aspects, the present invention describes an apparatus that tightly couples a memory hardware assist unit to each processor and memory node of a scalable array processor.

In one aspect of one embodiment of the present invention an apparatus is described for providing a memory assist function. At least one processing element (PE) and at least one memory directly associated with the at least one PE are used. An instruction decode function decodes a memory hardware assist instruction that is an instruction in the instruction set architecture of the at least one processing element and causes control signals to be generated to initiate the memory hardware assist function. A memory hardware assist unit having a memory interface to the at least one memory and a PE interface to the at least one PE, the memory hardware assist unit, after being initiated, iteratively fetches source operands over the memory interface from the at least one memory in parallel with PE operations in the at least one PE and generates at least one result operand that is selectively stored over the memory interface in the at least one memory.

In another embodiment of the present invention a method for providing a multi-cycle memory assist function is described. Receiving a hardware assist instruction in at least one processing element (PE) having an attached multi-cycle memory hardware assist unit and a memory directly associated with the at least one PE. Decoding in the PE a memory hardware assist instruction that is an instruction in the instruction set architecture of the at least one processing element to generate control signals that initiate the multi-cycle memory assist function in the multi-cycle memory hardware assist unit. Generating a memory address to be used in the multi-cycle memory hardware assist unit, wherein the memory address is the start address of source operands to be fetched from the memory associated with the multi-cycle memory hardware assist unit These and other features, aspects, techniques and advantages of the present invention will be apparent to those skilled in the art from the following detailed description, taken together with the accompanying drawings and claims.

BRIEF DESCRIPTION OF THE DRAWINGS

FIG. 3A illustrates a load hardware assist (LHA) instruction format in accordance with the present invention;

FIG. 3B illustrates a syntax and operation description table for the LHA instruction in accordance with the present invention.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
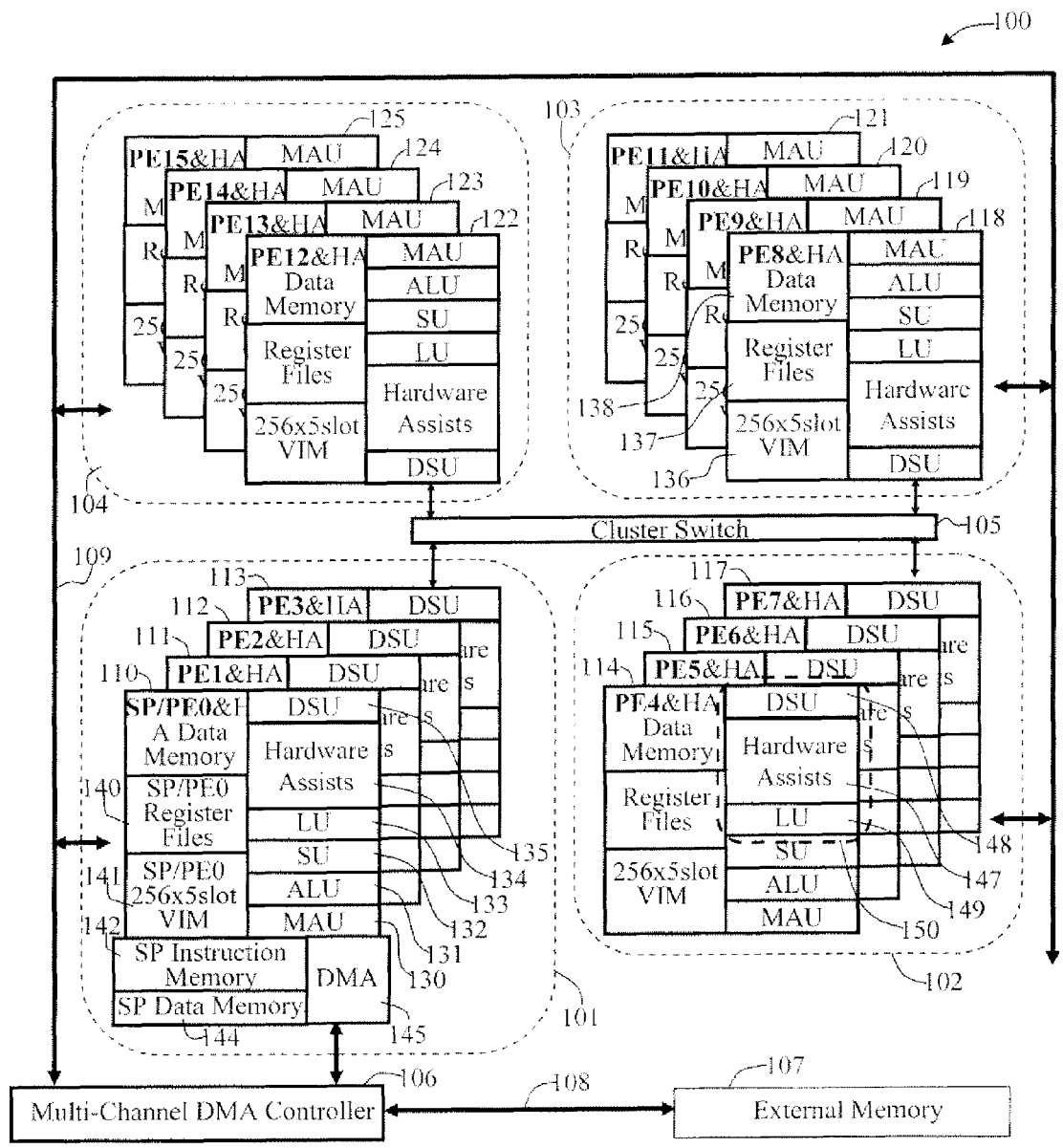
FIG. 1 illustrates a sixteen node video-specific processor ($VSP_{16}$) in accordance with one or more embodiments of the present invention.

FIG. 1 illustrates a sixteen-node video signal processor ($VSP_{16}$) 100 in accordance with one or more embodiments of the present invention. The $VSP_{16}$ 100 contains four transform engine (TE) clusters 101-104, an interconnection network cluster switch 105, a multi-channel direct memory access (DMA) controller 106, and an external memory 107. The DMA controller 106 interfaces with the external memory 107 over an external memory bus 108 to transfer data to and from the external memory to each of the TE clusters over a multi-channel DMA bus 109.

Sixteen processor engines (PEs) 110-125 are partitioned in groups of four PEs per cluster as a 4×4 array organization. Each PE provides programmable processing and hardware assist functions. SP/PE0 110 is unique as compared to the other fifteen PEs 111-125, having an array controlling function combined with the PE function of PE0. The common features of the sixteen PEs 110-125 include a set of instruction execution units including a multiply accumulate unit (MAU) 130, an arithmetic logic unit (ALU) 131, a store unit (SU) 132, a load unit (LU) 133, a hardware assist (HA) 134, a data select unit (DSU) 135, a 256×5 slot very long instruction word memory (VIM) 136, a local PE register file 137, and a data memory 138 local to each PE and HA. Each PE also contains local pipeline controls, decode logic, and control logic appropriate for each PE. All $VSP_{16}$ instructions are executed in a simple pipeline with a majority of instructions requiring a single execution stage and a few instructions requiring two execution stages that are pipelined.

The unique SP/PE0 110 combines a controlling function sequence processor (SP) combined with PE0 functions. To support the SP and PE0, a separate SP register file and a separate PE0 register file, illustrated in one block as SP/PE0 register files 140 are used to maintain the processing context of the SP and PE0. Though not limited to this, the SP/PE0 shares a single VIM 141. To control the $VSP_{16}$ the SP has a single thread of control supported by an SP instruction memory 142 and an SP data memory 144. The SP provides program control, contains instruction and data address generation units, supports interrupts, provides DMA control, and dispatches instructions to the PEs 110-125. The SP executes branches and controls the fetching an issuing of instructions, such as load VLIW and execute VLIW instructions. The load VLIW instruction provides an indirect VIM address and is used to load the instruction slots at the specified VIM address. The execute VLIW instruction causes a VLIW to be selected at a specified indirect VIM address and executed.

The single SP thread of control supports 4×4 sub-threads which operate synchronously in lock step single instruction multiple data (SIMD) fashion. Each sub-thread uses very long instruction words (VLIWs) which are indirectly selected and executed by the single SP thread. Each VLIW in each PE at the same VIM address may be different but all unmasked PEs access the same VIM address when executing a VLIW. Five 32-bit instruction slots are provided in each PE, such that with 16 PEs 80 32-bit instructions can execute simultaneously. In addition single, dual, quad, and octal packed data operations may be specified independently by each slot instruction thereby supporting up to 8*80=640 instruction specified operations per cycle. As an example of the processing power this provides, a $VSP_{16}$ operating at 250 Mhz may achieve 640*250 Mhz=160 Giga operations per second.

The $VSP_{16}$ processor also uses an interconnection network cluster switch 105 providing single cycle data transfers between PEs within clusters and between PEs in orthogonal clusters. The communication operations are controlled by a DSU instruction which can be included in a VLIW thereby overlapping communications with computations which with proper software pipelining the communication latency can be reduced to zero. The communication operations operate independently of the DMA which may operate in the background to stream data between the local PE memories and the external memories.

To support additional processing capability for application specific functions such as motion estimation/compensation, deblocking filters, and other high compute functions, a hardware assists unit (HAU) with advantageous separate connections to local PE memory is provided. A HAU has one or more multi-cycle tightly coupled state machine functions which provide memory intensive application specific operational capability to each of the PEs in the $VSP_{16}$. To provide a scalable mechanism for adding multiple HAUs, a novel tightly coupled interface is provided by the load unit (LU) and data select unit (DSU) of each PE. For example, HAU 147 interlaces with DSU 148 and LU 149 and the local data memory associated with PE4 114 as a transform engine 150.

Figure 2:
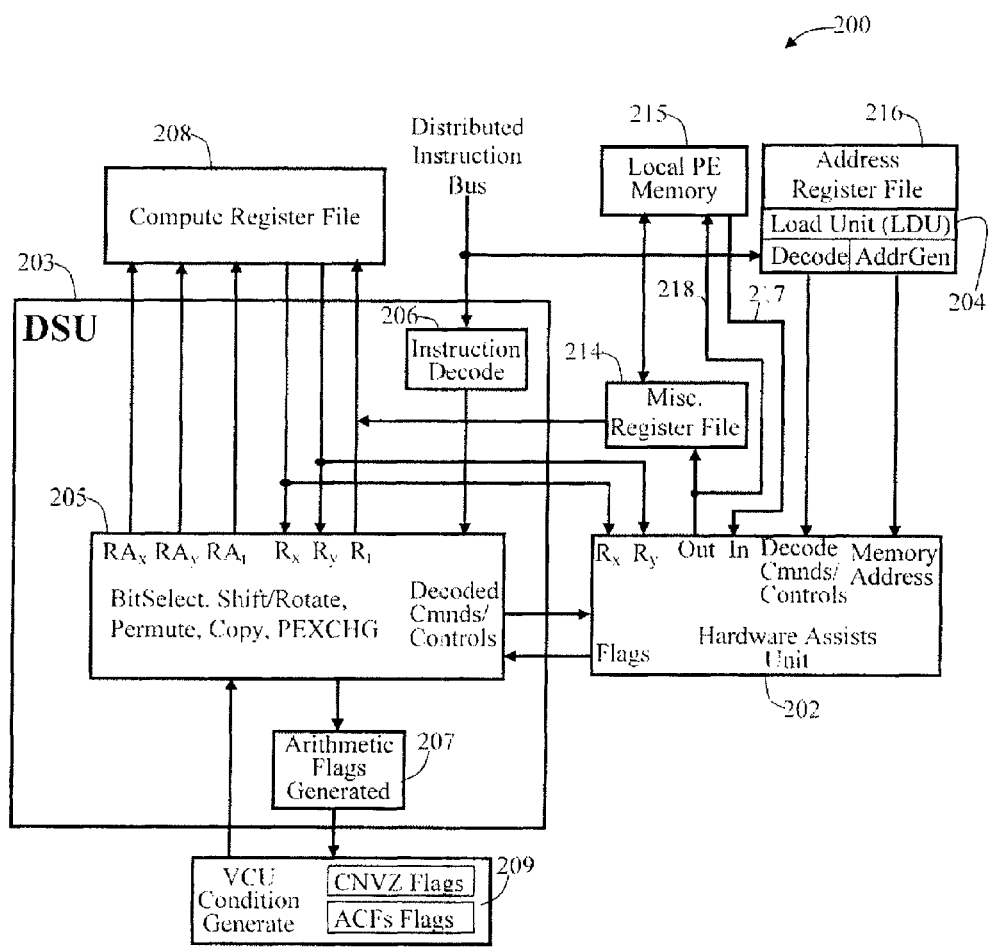
FIG. 2 illustrates a transform engine (TE) as a combined instruction and assist function in accordance with a number of embodiments of the present invention.

FIG. 2 illustrates a transform engine (TE) subsystem 200 as a combined instruction execution and hardware assist function in accordance with a number of embodiments of the present invention. The TE subsystem 200 includes a hardware assists unit (HAU) 202 that interfaces with a data select unit (DSU) 203, local PE memory 215, and load unit (LU) 204. The DSU 203 has an instruction execution unit 205, an instruction decode function 206, and an arithmetic flags generated function 207. The DSU 203 interfaces with a compute register file 208 of a PE and a VLIW control unit (VCU) condition generate function 209. The HAU 202 fetches data from, the local PE memory 215 over an input data path 217. The HAU 202 generates results which may be stored over out data path 218 in a miscellaneous register file (MRF) 214 or in the local PE data memory 215. The instruction execution unit 205 supports the execution of bit select, shift/rotate, permute, copy, pexchange, and the like DSU instructions. DSU instructions may execute in parallel while the HAU 202 is operating. The load unit 204 supports the execution of direct, indirect, broadcast and the like LU instructions used primarily for loading data from memory to a compute register file, address register file 216, miscellaneous register file 214, hardware assist registers internal to the HAU 202, and the like. LU and DSU instructions may execute in parallel while HAU 202 is operating.

FIG. 3A illustrates a load hardware assist (LHA) instruction format 300 in accordance with the present invention. Operations in the HAU 202 may be initiated by use of an LU instruction or a DSU instruction.

FIG. 3B illustrates a syntax and operation description table 350 for the LHA instruction in accordance with the present invention. Reference to elements of the TE subsystem 200 in FIG. 2 and the bit fields of the LHS instruction format 300 of FIG. 3 are included as representative of elements and bit fields used in the operation of TE subsystems of other PEs in the $VSP_{16}$. A load HA (LHA) instruction causes an address value for a byte, halfword, word or doubleword to be loaded into the Hardware Assist Unit (HAU) 202 even target register Rae as specified in bit field 304 from an address generation function in LDU 204. Source address register An 306 selected from address register file 216 contains a base address. CRF register Rx selected from CRF 208 as specified in bit field 308 is also transferred to the HAU 202 into an odd target register Rao associated with Rae as specified in bit field 304. If bit 5 Rz/Az 310 is enabled for Rz (Rz/Az=0) then the CRF bit field 308 specifies an even/odd register pair where the compute register Rz=Rxo contains the unsigned index of the address and Rxe is loaded into HA Rao. If bit 5 Rz/Az 310 is enabled for Az (Rz/Az=1) then the CRF bit field 308 specifies a 32-bit register Rx to be loaded into HAU 202 Rao and address register Az contains the unsigned index of the address. The index can be specified to be added to or subtracted from the base address. Bit 3 (En F0) 312 enables the setting of a PE's arithmetic condition flag (ACF) F0 upon completion of a hardware assist function, as an OR of hardware assist function flags on completing execution. The enable bit may also enable any hardware assist unit, such as hardware assist units HA1, HA2, and HA3, to store a corresponding ACF flag. For example, HA1 is enabled to set F1, HA2 to set F2, HA3 to set F3 with HA1 OR HA2 OR HA3 setting the F0 flag. It is noted that the $VSP_{16}$ processor supports unaligned data accesses. Doublewords, words, halfwords and bytes may be accessed at any byte address. The LHA instruction as illustrated in LHA instruction format 300 executes in a single cycle.

Figure 4:
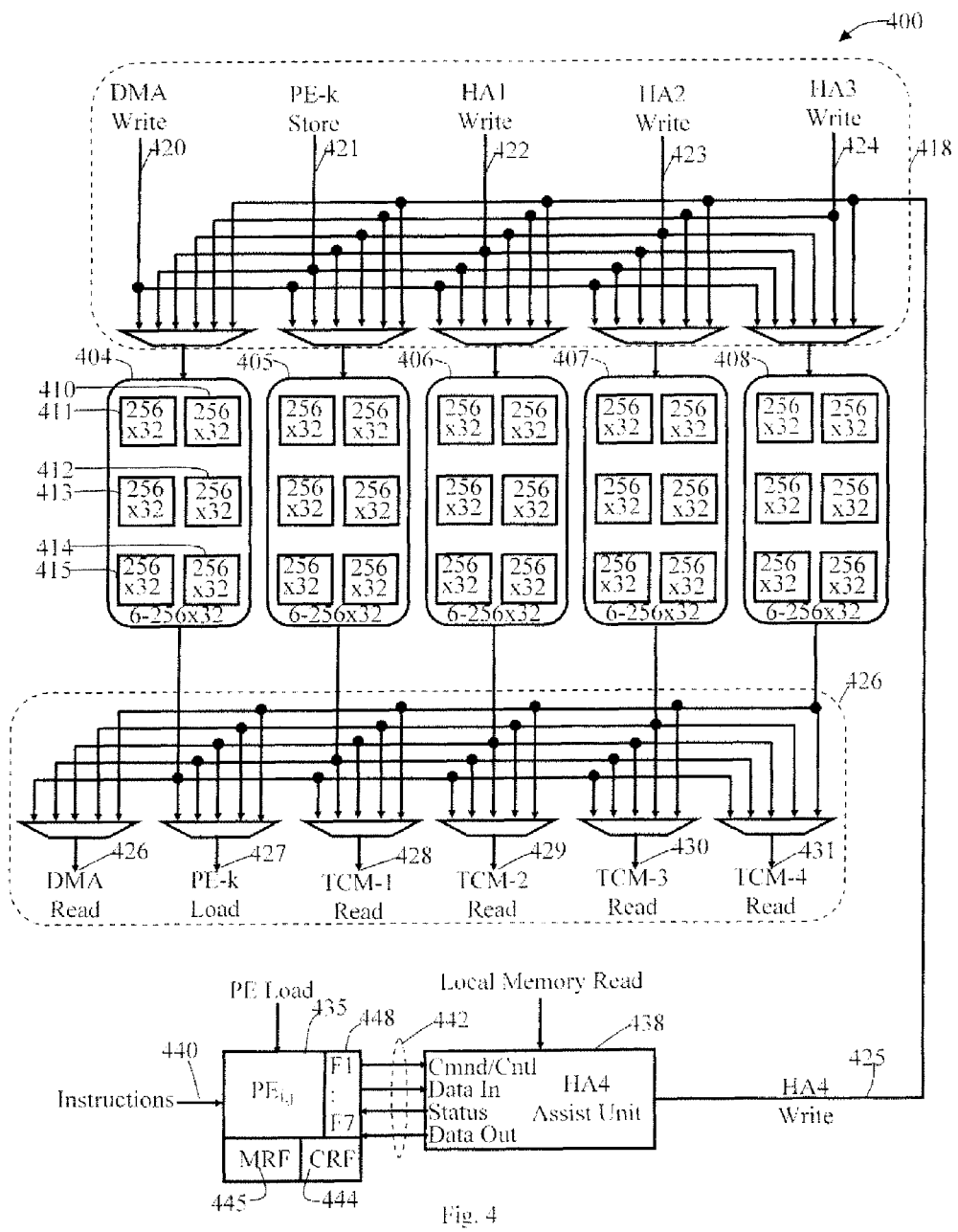
FIG. 4 illustrates an exemplary hardware assist memory organization in accordance with the present invention.

FIG. 4 illustrates an exemplary hardware assist (HA) memory organization 400 in accordance with the present invention. The HA memory organization 400 contains at least two memory blocks, such as memory block. 404 and 405 providing support for a local PE memory and a HA memory. In the exemplary HA memory organization 400, five memory blocks 404-408 are shown, supporting a local PE 435 and four hardware assist units, such as HA4 438. Each of the five memory blocks 404-408 is made up of multiple smaller blocks of memory. For example, memory block 404 is made up of six 256×32 blocks 410-415. For different video algorithms, the precision of pixel values may vary. For example, 8-bit, 10-bit, and 12-bit pixel values may be used. In the five memory blocks 404-408 a common memory organization is assumed to allow PE load and store accessibility to each memory block. With PE data types of 8-bit, 16-bit, 32-bit, and 64-bit for example, two of the six memory blocks can be accessed to support 64-bit packed data load and store operations. For 10-bit pixels, hardware assists can access five 256× 32 memory blocks to obtain sixteen 10-bit pixels. For 12-bit pixels, hardware assists can access three 256×32 memory blocks to obtain eight 12-bit pixels. Other variations are feasible, such as using K×8 memory blocks, for example, where K is application dependent. For 10-bit and 12-bit pixels, the PE could operate on the data using 16-bit data types or additional data types can be added to the instruction set architecture allowing the PEs to directly operate on packed 10-bit and 12-bit pixels.

Write multiplexing 418 is shown for the five memory blocks 404-408 including support for direct memory assist (DMA) write 420, PE store 421, and, for example, four hardware assist write operation paths 422-425. An exemplary fourth hardware assist unit HA4 438 may also use a path to a PE compute register file 444 or miscellaneous register file 445, for example, for result storage. Read multiplexing 426 is shown for six units including DMA read 426, PE load 427, and for example, four hardware assist read operations 428-431. APE 435 initiates operations on a hardware assist unit, such as HA unit 438, when the PE 435 receives a hardware assist instruction 440. The PE 435 interfaces with the HA unit 438 through a command and data interface 442. Examples of command/controls include unique decode control signals that select a HA unit from a grouping of multiple HA units. Examples of data that may be used on the command and data interface 442 include a start address for HA memory operations, HA parameter control such as stride and hold specification, block size, and type of operations which more suitably are provided through register passing from the PE 435 compute register file 444. The hardware assist units provide their own state machine control for memory addressing as initiated and controlled by the PE and operate independently of the PE once operations have been started. Status of hardware assist operations may include the setting of arithmetic control flags (ACFs) F1-F7 flags 448, such as setting F1 when HA-1 operation is complete, setting F2 when HA-2 operation is complete, . . . , setting F7 when an HA-7, if used, operation is complete and setting F0 as a logical OR of the F1-F7 flags 448.

While the present invention has been disclosed in the context of various specific illustrative embodiments, it will be recognized that the invention may be suitably applied to other environments and applications consistent with the claims which follow.

We claim:

1. An apparatus for providing a memory hardware assist function, the apparatus comprising:
at least one processing element (PE) having a PE interface, a PE address storage unit, a PE data storage unit, and PE execution units for execution of PE instructions, wherein an execution of a PE function instruction functionally operates on data accessed from the PE data storage unit;
at least one memory having a first memory interface and a second memory interface, the at least one memory is directly associated with the at least one PE over the first memory interface, wherein an execution of a PE load instruction loads data from the at least one memory at a first address over the first memory interface to the PE data storage unit and an execution of a PE store instruction stores data from the PE data storage unit over the first memory interface to the at least one memory at a second address, wherein the first address and the second address are based on address values selected from the PE address storage unit;
an instruction decode function which decodes a memory hardware assist instruction that is an instruction in the instruction set architecture of the at least one processing element, the memory hardware assist instruction specifies an operation that selects a third address from the PE address storage unit, a data value from the PE data storage unit, and causes control signals to be generated and connected to the PE interface; and
a memory hardware assist unit coupled to the second memory interface of the at least one memory and coupled to the PE interface of the at least one PE, the memory hardware assist unit, after being initiated by the third address, the data value, and the control signals received from the PE interface, iteratively fetches a plurality of source operands over the second memory interface from the at least one memory to the memory hardware assist unit in parallel with the PE instructions executing on the PE execution units in the at least one PE and the memory hardware assist unit generates at least one result operand that is selectively stored over the second memory interface in the at least one memory.

2. The apparatus of claim 1 wherein the third address and the data value are parameters that are passed to the memory hardware assist unit over the PE interface to control a memory assist function operating in the memory hardware assist unit.

3. The apparatus of claim 2 wherein the parameters include a start address and a memory block size of the plurality of source operands which are fetched by the memory hardware assist unit.

4. The apparatus of claim 1 wherein the at least one result is selectively stored in an architected register of the at least one PE.

5. The apparatus of claim 1 further comprising:
a plurality of PEs;
a plurality of memories each directly associated with a PE of the plurality of PEs; and
a plurality of memory hardware assist units each having a memory interface to one of the plurality of memories and a PE interface to one of the plurality of PEs that are directly associated to each other, wherein the memory hardware assist instruction initiates the plurality of memory hardware assist units to operate in parallel with each other and with PE operations in the plurality of PEs.

6. The apparatus of claim 1 further comprising:
a plurality of memories each directly associated with the at least one PE; and
a plurality of memory hardware assist units each having a memory interface to the plurality of memories and a PE interface to the at least one PE, each memory hardware assist unit, after being initiated, iteratively fetches source operands over its associated memory interface in parallel with PE operations in the at least one PE and generates at least one result operand that is selectively stored in its associated memory.

7. A method for providing a multi-cycle memory assist function, the method comprising:
receiving a hardware assist instruction in at least one processing element (PE) having a PE interface, a PE address storage unit, a PE data storage unit, and PE execution units for execution of PE instructions and the at least one PE coupled to a multi-cycle memory hardware assist unit over the PE interface and coupled to a memory that is directly associated with the at least one PE over a first memory interface and directly associated with the multi-cycle memory hardware assist unit over a second memory interface, wherein an execution of a PE function instruction functionally operates on data provided by the PE data storage unit;
decoding in the at least one PE a memory hardware assist instruction that is an instruction in the instruction set architecture of the at least one PE, the memory hardware assist instruction specifies an operation that selects one or more parameters from the PE address storage unit or the PE data storage unit, and causes control signals to be generated that are communicated over the PE interface to initiate a multi-cycle memory assist function in the multi-cycle memory hardware assist unit; and
generating a memory address based on the one or more parameters communicated over the PE interface to be used in the multi-cycle memory hardware assist unit, wherein the memory address is a start address of a plurality of source operands to be fetched from the memory over the second memory interface and operated on in the multi-cycle memory hardware assist unit in parallel with the PE instructions executing on the PE execution units.

8. The method of claim 7 further comprising:
selecting a PE register based on information contained in the memory hardware assist instruction, wherein contents of the selected PE register are used to support the multi-cycle memory assist function.

9. The method of claim 7 further comprising:
passing the one or more parameters to the multi-cycle memory hardware assist unit to support the multi-cycle memory assist function.

10. The method of claim 9 wherein the one or more parameters indicate a start address and a memory block size of the plurality of source operands which are fetched by the multi-cycle memory hardware assist unit.

11. The method of claim 7 further comprising:
setting a flag in the at least one PE to indicate a completion status of the multi-cycle memory assist function.

12. A scalable array of processing elements and hardware assist units, the scalable array comprising:
a plurality of data memories each data memory having a first memory interface and a second memory interface;
a plurality of processing elements (PEs), each PE coupled by the first memory interface to a corresponding data memory, each PE having a PE interface, a local storage unit internal to each PE, a load execution unit that executes a PE load instruction to fetch data from the corresponding data memory over the first memory interface and load the fetched data in the local storage unit, a store execution unit that executes a PE store instruction to fetch data from the local storage unit over the first memory interface and store the fetched data in the corresponding data memory, and an arithmetic execution unit that executes PE arithmetic instructions to operate on data supplied to the arithmetic execution unit from the local storage unit; and
a plurality of hardware assist units, each hardware assist unit coupled to a corresponding PE by the PE interface and coupled to the corresponding data memory by the second memory interface, each hardware assist unit having a state machine unit that is initiated by the corresponding PE over the PE interface to fetch data from the corresponding data memory over the second memory interface to execute a multi-cycle memory intensive function in the state machine unit and to store data generated in the state machine unit over the second memory interface in the corresponding data memory in response to the execution of the multi-cycle memory intensive function, wherein the multi-cycle memory intensive function executes in the hardware assist unit in parallel with PE instructions that execute in the corresponding PE.

13. The scalable array of claim 12, wherein each data memory comprises:
N+1 memory blocks for N equal to a number of state machine units tightly coupled to each PE, wherein the N+1 memory blocks each comprising a plurality of smaller K by M memory blocks.

14. The scalable array of claim 12, wherein each state machine unit generates memory addressing independently of the coupled PE once state machine operations have been initiated.

15. The scalable array of claim 12, wherein each PE accesses data from the corresponding data memory in power of 2 data widths and each state machine unit accesses data from the corresponding data memory in multiple display pixel data widths.

16. The scalable array of claim 15, wherein the display pixel data widths are 8-bit, 10-bit, and 12-bit data widths.

17. The scalable array of claim 15, wherein each state machine accesses two K by 32 memory blocks in the corresponding data memory to provide eight 8-bit display pixels per access.

18. The scalable array of claim 15, wherein each state machine accesses five K by 32 memory blocks in the corresponding data memory to provide sixteen 10-bit display pixels per access.

19. The scalable array of claim 15, wherein each state machine accesses three K by 32 memory blocks in the corresponding data memory to provide eight 12-bit display pixels per access.

20. The scalable array of claim 12, wherein a flag is set in each corresponding PE to indicate a completion status of the multi-cycle memory intensive function in each coupled hardware assist unit.

* * * * *